United States Patent
Richardson et al.

(10) Patent No.: US 10,988,230 B2
(45) Date of Patent: Apr. 27, 2021

(54) PASSIVE MOISTURE MANAGEMENT BLADDER IN AN AIRCRAFT

(71) Applicant: The Boeing Company, Chicago, IL (US)

(72) Inventors: Marcus K. Richardson, Everett, WA (US); Brian T. Imada, Everett, WA (US); Eric L. Sarinas, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 329 days.

(21) Appl. No.: 15/626,562

(22) Filed: Jun. 19, 2017

(65) Prior Publication Data

US 2018/0362134 A1  Dec. 20, 2018

(51) Int. Cl.
*B64C 1/06* (2006.01)
*B64D 13/06* (2006.01)

(52) U.S. Cl.
CPC .............. *B64C 1/067* (2013.01); *B64D 13/06* (2013.01); *B64D 2013/0662* (2013.01)

(58) Field of Classification Search
CPC .. B64C 1/067; B64C 1/06; B64C 1/12; B64C 1/066; B64C 1/40; B64D 13/06; B64D 13/00; B64D 2013/0662; B63J 2/00
See application file for complete search history.

(56) References Cited

U.S. PATENT DOCUMENTS

| | | | | | |
|---|---|---|---|---|---|
| 2,324,654 | A | * | 7/1943 | Tinnerman | B64C 1/066 24/543 |
| 2,912,724 | A | * | 11/1959 | Wilkes | B64C 1/066 181/207 |
| 3,077,426 | A | * | 2/1963 | Johnston | B29C 43/021 112/410 |
| 3,090,646 | A | * | 5/1963 | Johnson | B60J 7/123 160/392 |
| 3,231,944 | A | * | 2/1966 | Bennett | E04B 1/7666 116/63 P |
| 3,392,220 | A | * | 7/1968 | Jennings | B61D 5/04 220/560.15 |
| 3,740,905 | A | * | 6/1973 | Adams | B64C 1/067 52/404.3 |
| 3,775,921 | A | * | 12/1973 | Avera | E04B 1/6803 52/471 |
| 3,867,244 | A | * | 2/1975 | Adams | B64C 1/067 428/182 |
| 4,235,398 | A | * | 11/1980 | Johnson | B32B 3/12 244/119 |
| 4,291,851 | A | * | 9/1981 | Johnson | B32B 3/12 244/119 |
| 4,308,309 | A | * | 12/1981 | Frosch | B64G 1/58 102/289 |
| 4,318,260 | A | * | 3/1982 | Siegel | E04D 13/1637 52/407.4 |

(Continued)

*Primary Examiner* — Medhat Badawi
(74) *Attorney, Agent, or Firm* — Felix L. Fischer

(57) ABSTRACT

A moisture management system for use in an aircraft incorporates a bladder supported between adjacent structural members between a skin and a sidewall panel. The bladder is configured to passively expand to contact at least one of the structural members as a pressure decreases during an ascent of the aircraft and to collapse as the pressure increases during a descent of the aircraft.

20 Claims, 12 Drawing Sheets

(56) References Cited

U.S. PATENT DOCUMENTS

| | | | | |
|---|---|---|---|---|
| 4,344,591 A * | 8/1982 | Jackson | B64C 1/38 | 244/132 |
| 4,399,645 A * | 8/1983 | Murphy | E04B 1/7604 | 52/2.11 |
| 4,488,619 A * | 12/1984 | O'Neill | B32B 27/08 | 181/290 |
| 4,869,762 A * | 9/1989 | Tonokowa | F17C 13/001 | 156/186 |
| 4,927,705 A * | 5/1990 | Syme | B32B 27/12 | 428/192 |
| 4,940,112 A * | 7/1990 | O'Neill | E04B 1/86 | 181/288 |
| 5,030,518 A * | 7/1991 | Keller | B64G 1/58 | 428/138 |
| 5,048,248 A * | 9/1991 | Ting | E04C 2/292 | 52/309.9 |
| 5,318,108 A * | 6/1994 | Benson | A47J 41/02 | 165/96 |
| 5,386,952 A * | 2/1995 | Nordstrom | B64C 1/067 | 244/118.1 |
| 5,398,889 A * | 3/1995 | White | B64C 1/067 | 244/119 |
| 5,472,760 A * | 12/1995 | Norvell | B32B 5/18 | 428/71 |
| 5,511,747 A * | 4/1996 | Parrot | B64G 1/58 | 244/159.1 |
| 5,545,273 A * | 8/1996 | Rasky | B32B 3/02 | 156/60 |
| 5,565,254 A * | 10/1996 | Norvell | B32B 5/18 | 428/134 |
| 5,577,688 A * | 11/1996 | Sloan | B64C 1/067 | 244/117 R |
| 5,611,504 A * | 3/1997 | Haynes | B32B 27/12 | 244/119 |
| 5,759,659 A * | 6/1998 | Sanocki | F16L 59/02 | 244/119 |
| 5,788,184 A * | 8/1998 | Eddy | B32B 5/02 | 244/119 |
| 5,792,539 A * | 8/1998 | Hunter | B32B 3/28 | 428/72 |
| 5,806,272 A * | 9/1998 | Lafond | E06B 3/66328 | 156/109 |
| 5,811,167 A * | 9/1998 | Norvell | B29C 65/02 | 428/76 |
| 5,897,079 A * | 4/1999 | Specht | B64C 1/067 | 244/118.5 |
| 6,012,532 A * | 1/2000 | Kiefer | A62C 3/02 | 169/26 |
| 6,358,591 B1 * | 3/2002 | Smith | B64C 1/40 | 428/121 |
| 6,491,254 B1 * | 12/2002 | Walkinshaw | A62C 3/08 | 244/118.5 |
| 7,040,575 B2 * | 5/2006 | Struve | B64C 1/40 | 244/118.5 |
| 7,108,227 B2 * | 9/2006 | Kunzel | B64C 1/40 | 244/119 |
| 7,946,525 B2 * | 5/2011 | Groning | B64C 1/403 | 181/294 |
| 8,016,241 B2 * | 9/2011 | Moores | B64C 1/40 | 244/119 |
| 8,157,209 B2 * | 4/2012 | Dittmar | B64C 1/066 | 244/117 R |
| 8,245,974 B2 * | 8/2012 | Paul | B64C 1/403 | 244/119 |
| 8,336,822 B2 * | 12/2012 | MacGregor | B64C 1/40 | 244/119 |
| 8,490,365 B2 * | 7/2013 | Mueller | B32B 3/12 | 244/123.13 |
| 8,616,498 B2 * | 12/2013 | Hossain | B32B 27/12 | 244/121 |
| 8,662,448 B2 * | 3/2014 | Weston | B64C 1/40 | 244/119 |
| 8,857,562 B2 * | 10/2014 | Morgan | B64C 1/403 | 181/284 |
| 8,876,048 B2 * | 11/2014 | Herrmann | B64C 1/066 | 244/119 |
| 8,882,041 B2 * | 11/2014 | Mueller | B64C 1/40 | 244/121 |
| 8,899,519 B2 * | 12/2014 | Smith | B64C 1/40 | 244/117 R |
| 9,102,392 B2 * | 8/2015 | Gray | B64C 1/067 | |
| 9,211,945 B2 * | 12/2015 | Redecker | B64C 1/067 | |
| 9,688,383 B2 * | 6/2017 | Smith | B64C 1/40 | |
| 9,802,692 B2 * | 10/2017 | Smith | B64C 1/40 | |
| 10,023,286 B2 * | 7/2018 | Dickson | B64C 1/40 | |
| 2002/0168184 A1 * | 11/2002 | Meisiek | B64C 1/18 | 392/435 |
| 2003/0061776 A1 * | 4/2003 | Alderman | E04B 1/76 | 52/404.1 |
| 2003/0087049 A1 * | 5/2003 | Hachenberg | B64C 1/067 | 428/34.1 |
| 2004/0000113 A1 * | 1/2004 | Alderman | B32B 5/02 | 52/407.5 |
| 2004/0175516 A1 * | 9/2004 | Schmitz | B64C 1/067 | 428/34.1 |
| 2005/0044712 A1 * | 3/2005 | Gideon | B60R 13/02 | 29/897.32 |
| 2005/0211839 A1 * | 9/2005 | Movsesian | B64C 1/40 | 244/119 |
| 2006/0046598 A1 * | 3/2006 | Shah | B32B 3/04 | 442/394 |
| 2006/0118676 A1 * | 6/2006 | Novak | B64C 1/066 | 244/129.1 |
| 2006/0145006 A1 * | 7/2006 | Drost | B64C 1/066 | 244/118.5 |
| 2006/0194893 A1 * | 8/2006 | Prybutok | C08J 9/42 | 521/136 |
| 2006/0248854 A1 * | 11/2006 | Bartley-Cho | B32B 3/12 | 52/782.1 |
| 2006/0284014 A1 * | 12/2006 | Muller | A62C 2/06 | 244/119 |
| 2008/0302910 A1 * | 12/2008 | Calamvokis | B64C 1/067 | 244/118.5 |
| 2009/0090812 A1 * | 4/2009 | Boock | B64C 1/40 | 244/1 N |
| 2009/0308975 A1 * | 12/2009 | MacGregor | B64C 1/066 | 244/119 |
| 2010/0199583 A1 * | 8/2010 | Behrens | B64G 1/58 | 52/396.01 |
| 2010/0240290 A1 * | 9/2010 | Markwart | B64D 13/00 | 454/71 |
| 2011/0009042 A1 * | 1/2011 | Joern | B64C 1/067 | 454/71 |
| 2011/0027526 A1 * | 2/2011 | McCarville | B29C 70/30 | 428/116 |
| 2011/0284689 A1 * | 11/2011 | Thomas | B64C 1/066 | 244/1 N |
| 2012/0273618 A1 * | 11/2012 | Fernando | B64C 1/40 | 244/129.2 |
| 2013/0161123 A1 * | 6/2013 | Morgan | E04B 1/84 | 181/175 |
| 2013/0240668 A1 * | 9/2013 | Holm | B64C 1/067 | 244/1 N |
| 2014/0189986 A1 * | 7/2014 | Carrillo | F16B 2/24 | 24/564 |
| 2015/0274278 A1 * | 10/2015 | Lucas | B64C 1/40 | 244/1 N |
| 2015/0274303 A1 * | 10/2015 | Gray | B64C 1/18 | 454/71 |
| 2017/0036769 A1 * | 2/2017 | Humfeldt | B64C 1/403 | |
| 2017/0100908 A1 * | 4/2017 | Fernando | B32B 5/245 | |
| 2017/0106965 A1 * | 4/2017 | Dickson | B64C 1/40 | |
| 2017/0113776 A1 * | 4/2017 | Johnson | B64C 1/067 | |
| 2017/0129582 A1 * | 5/2017 | Hitchcock | B64C 1/067 | |
| 2017/0144743 A1 * | 5/2017 | Dickson | B64C 1/40 | |
| 2017/0259901 A1 * | 9/2017 | Smith | B64C 1/40 | |
| 2018/0065726 A1 * | 3/2018 | Berryessa | B64F 5/40 | |
| 2018/0105252 A1 | 4/2018 | Hitchcock | B64C 1/067 | |

(56) References Cited

U.S. PATENT DOCUMENTS

2018/0194450 A1* 7/2018 Petersen .................. B64C 1/14
2018/0201357 A1* 7/2018 Borumand .............. B64C 1/067
2018/0201359 A1* 7/2018 Zaman .................... B64C 1/067
2018/0362134 A1* 12/2018 Richardson ............. B64C 1/067

* cited by examiner

PASSIVE MOISTURE MANAGEMENT BLADDER IN AN AIRCRAFT

BACKGROUND INFORMATION

Field

Embodiments of the disclosure relate generally to moisture control in aircraft compartments and more particularly to a passive control of airflow in spaces between interior components and an aircraft fuselage skin to mitigate stack effect for reduction of moisture collection.

Background

Air present in aircraft cabins tends to collect in warm volumes in the upper crown of the fuselage. Spaces between structural elements in the fuselage and the structure itself often have temperatures well below the dew point of the air collected in the crown. Flow of the moist air is exacerbated by stack effect within the internal volumes in the fuselage cabin structure. The buoyancy of the air as it contacts the skin (and cools down) drives airflow into the outboard stringer pockets, from the crown at the insulation blanket overlaps. The moisture in the air often condenses during flight operations and collects on interior surfaces. The condensate tends to flow down connecting structural members in the fuselage. This condensate may then trickle through gaps in the insulating blankets or interior linings and drip on passengers, the cabin interior furnishings and equipment; an effect known as "rain in the plane". At least one known system for controlling moisture is a zonal dryer system that draws in crown air, into a desiccant, discharges dry air, and channels liquid into the bilge to reduce humidity in the fuselage crown. The dryer systems require power and contribute to aircraft dry weight with associated costs in performance.

Buildings, especially tall buildings, can have the stack effect occur over the height of the building. However, buildings do not change pressures and temperatures as dramatically as an aircraft. The science of the stack effect in buildings applies to aircraft, but the solutions in buildings may not work in an aircraft. Further, solutions for buildings are focused on preventing the stack effect from quickly spreading a fire through the building. In an aircraft, the stack effect is problematic for moisture/ice accumulation. One fire prevention/containment feature on an aircraft is a nub/lip/block of insulation that acts as an air dam and fire stop above the return air grille. The nub closes out the gap behind the return air grille so a fire will not propagate from the lower lobe into the cabin. These nubs are not air tight but can retard a fire. A nub higher up behind the sidewall will not allow for a path for drainage when the ice melts because the nub always acts as a block in the drainage path.

SUMMARY

As disclosed herein a moisture management system for use in an aircraft incorporates a bladder supported between adjacent structural members between a skin and an interior wall. The bladder is configured to passively expand to contact at least one of the structural members as a pressure decreases during an ascent of the aircraft and to collapse as the pressure increases during a descent of the aircraft.

The embodiments disclosed allow a method for operating a moisture management system in an aircraft wherein the moisture management system includes a bladder coupled between adjacent structural members between a skin and a wall by expanding the bladder to contact at least one of the structural members as a pressure decreases during an ascent of the aircraft and collapsing the bladder to form a flow path along the at least one structural member as the pressure increases during a descent of the aircraft.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

DETAILED DESCRIPTION

The embodiments described herein provide methods and apparatus to reduce stack effect and to selectively prevent or reduce moist air flow within the aircraft cabin structural volumes and to eliminate condensate dripping within the cabin. More specifically, the embodiments and methods described herein provide a plurality of passive air bladders placed in frames of the fuselage structure between the cabin insulation blankets and aircraft skin at or just below overlapping seams or gaps in the insulation blankets. The bladders are configured to expand upon reducing pressure as the aircraft ascends in altitude and to collapse or contract as the pressure increases during descent. The bladders are sealed with dry air or other dry gas internal to the bladders at sea level ambient pressure with the bladders at an unexpanded volume. The bladders have sufficient internal volume or are elastic for expansion upon external pressure reduction due to altitude of the aircraft during flight. In the unexpanded condition, the bladders provide a gap between the insulation blankets and skin and along the frame members. In the expanded condition, the bladders seal against the insulation blanket, skin and frame structural elements to preclude airflow between the insulation and skin. The passive bladders require no power for operation and are both producible and installable with inexpensive materials and processes.

Figure 1A:
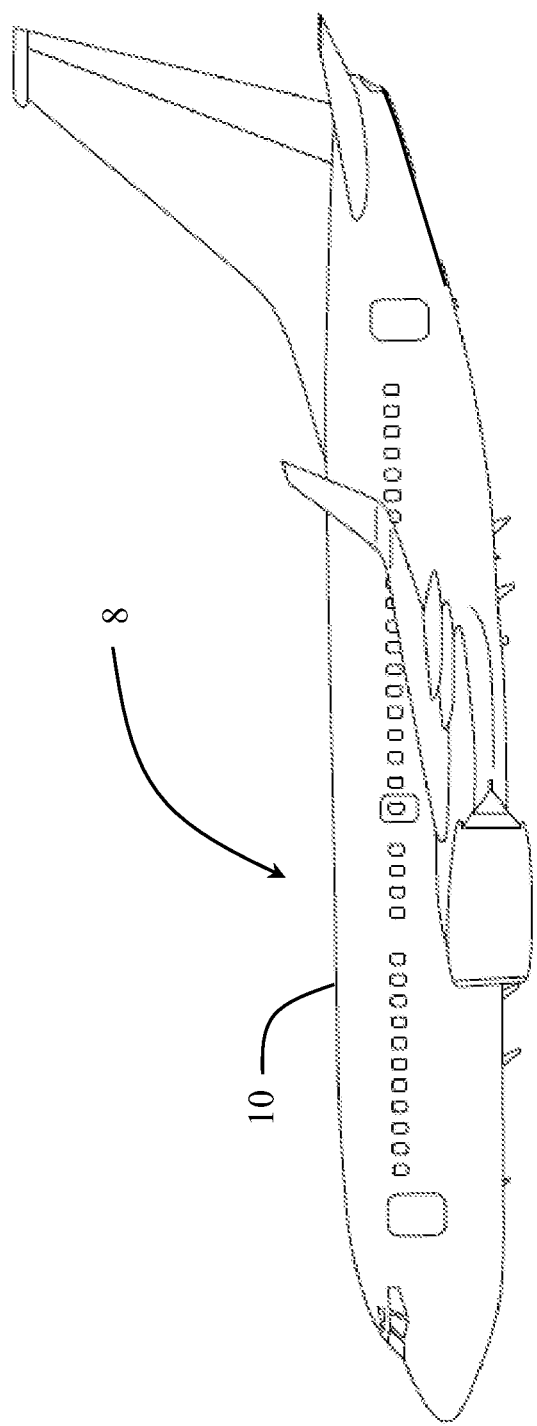
FIG. 1A is a pictorial representation of an aircraft in which the present embodiments may be employed.
Figure 1B:
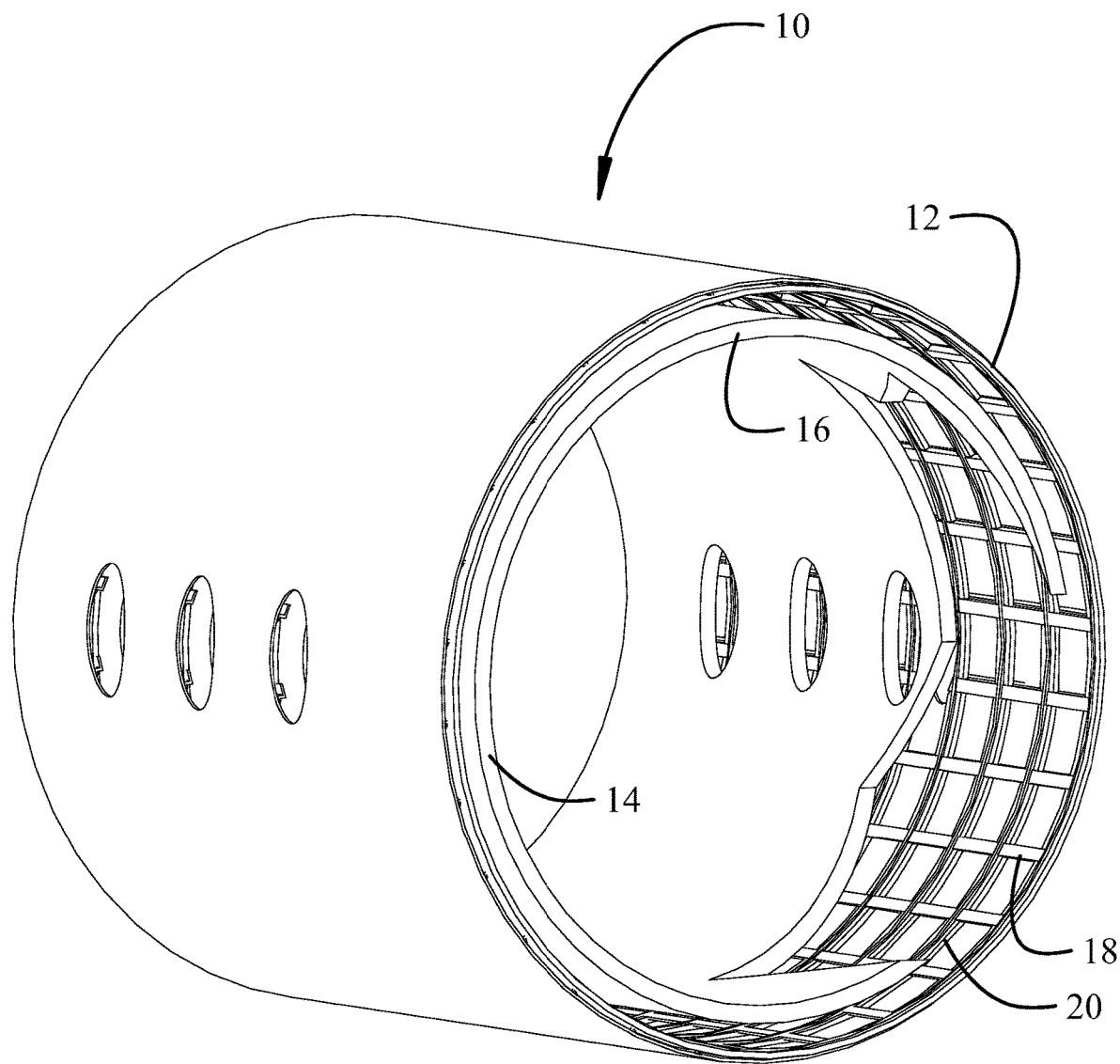
FIG. 1B is a pictorial view of a fuselage structure section with the interior panels sectioned to expose the structural members and skin.

FIG. 1A shows an aircraft 8 in which embodiments as disclosed herein may be employed. A fuselage structure 10 of the aircraft 8 as seen in greater detail in FIG. 1B, includes a moisture management system 11 having a one or more bladders 30, 32, as described in more detail below. The fuselage structure 10 includes a skin 12, walls 14, a ceiling 16, and structural members. The structural members can be stringers 18 and/or frames 20. The wall 14 can be referred to as an interior wall or a sidewall and can be removable panels. The skin 12 is spaced from the walls 14 and ceiling 16 of a passenger cabin (or other compartment), and the gap is at least partially filled with an insulation blanket (not shown in FIG. 1B for clarity). The insulation blanket, such as an insulation blanket 22 (shown in FIG. 2), typically incorporates a waterproof covering or is a waterproof material. During a flight, liquid from moist air can condense against the skin 12 and freeze during cruise. During descent this frozen liquid can thaw and drip. Because the insulation blanket 22 is waterproof, the condensate can flow along the insulation blanket 22 and drain into the bilge. However, in certain aircraft configurations where the insulation blankets are pushed in against the structural members (e.g., stringers 18 and frames 20), the insulation blanket may not contact the structural member. In other aircraft configurations a gap between the insulation blanket and structural members is intentionally maintained. Accordingly, a gap can be present along the structural member around the fuselage 10. In such a relatively long gap, the stack effect can occur during the flight of the aircraft and allow the buoyancy to drive moisture through the gap. The stack effect in these gaps can cause moisture and/or ice to accumulate between the outer skin 12 and the interior wall 14 and/or in the crown area.

Figure 2:
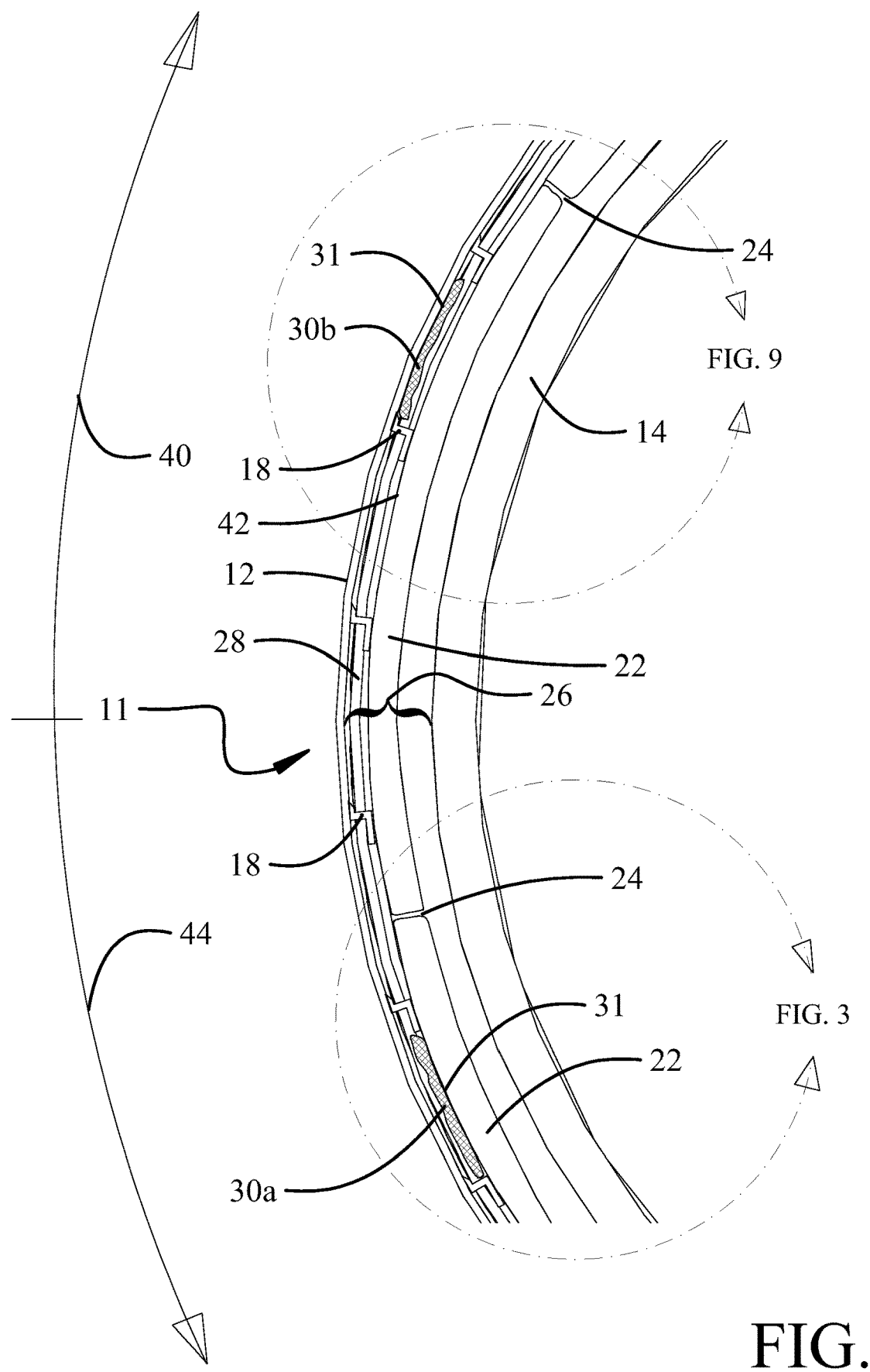
FIG. 2 is a partial end section view of the fuselage structure showing placement of expandable bladders between structural members.

As seen in FIG. 2, insulation blankets 22 are mounted between the cabin interior walls 14 and the skin 12. The insulation blankets 22 typically have separations or gaps 24 defined between adjacent insulation blankets 22. The separations or gaps 24 can allow ingress of moist air from the cavity 26 between the interior walls 14 and skin 12 into the stringer pockets 28 formed by the stringers 18 and frames 20 next to the skin (the spacing of elements is exaggerated in the drawings for clarity). The warm moist air tends to rise in the cavity 26 or along the frames 20 but once cooled against the skin 12 tends to descend in the cavity due to stack effect and other factors and during high altitude flight the moisture may condense and freeze onto the interior of the skin 12, insulation blankets 22 and structural members, such as the stringers 18 and frames 20.

As shown in FIG. 2, the moisture management system 11 is positioned with respect to the stringers 18, the frames 20, and/or the insulation blankets 22. The moisture management system 11 includes a bladder 30a, 30b, (collectively referred to as bladders 30) or 32 (shown in FIGS. 7 and 8). First and second bladders 30a, 30b, may be supported between the stringers 18 and frames 20 at desired locations, as will be described in greater detail subsequently. For example, at least one bladder 30 is supported between adjacent structural members 18, 20 between the skin 12 and the interior wall 14. The bladders 30a, 30b are expandable. More specifically, each bladder 30a, 30b is configured to passively expand to contact at least one of the structural members 18, 20 as a pressure decreases during an ascent of the aircraft and to collapse as the pressure increases during a descent of the aircraft. The bladder 30 may be also configured to passively expand to contact the skin 12 and the insulation blanket 22 as pressure decreases during the ascent and to collapse as the pressure increases during the descent.

Figure 3:
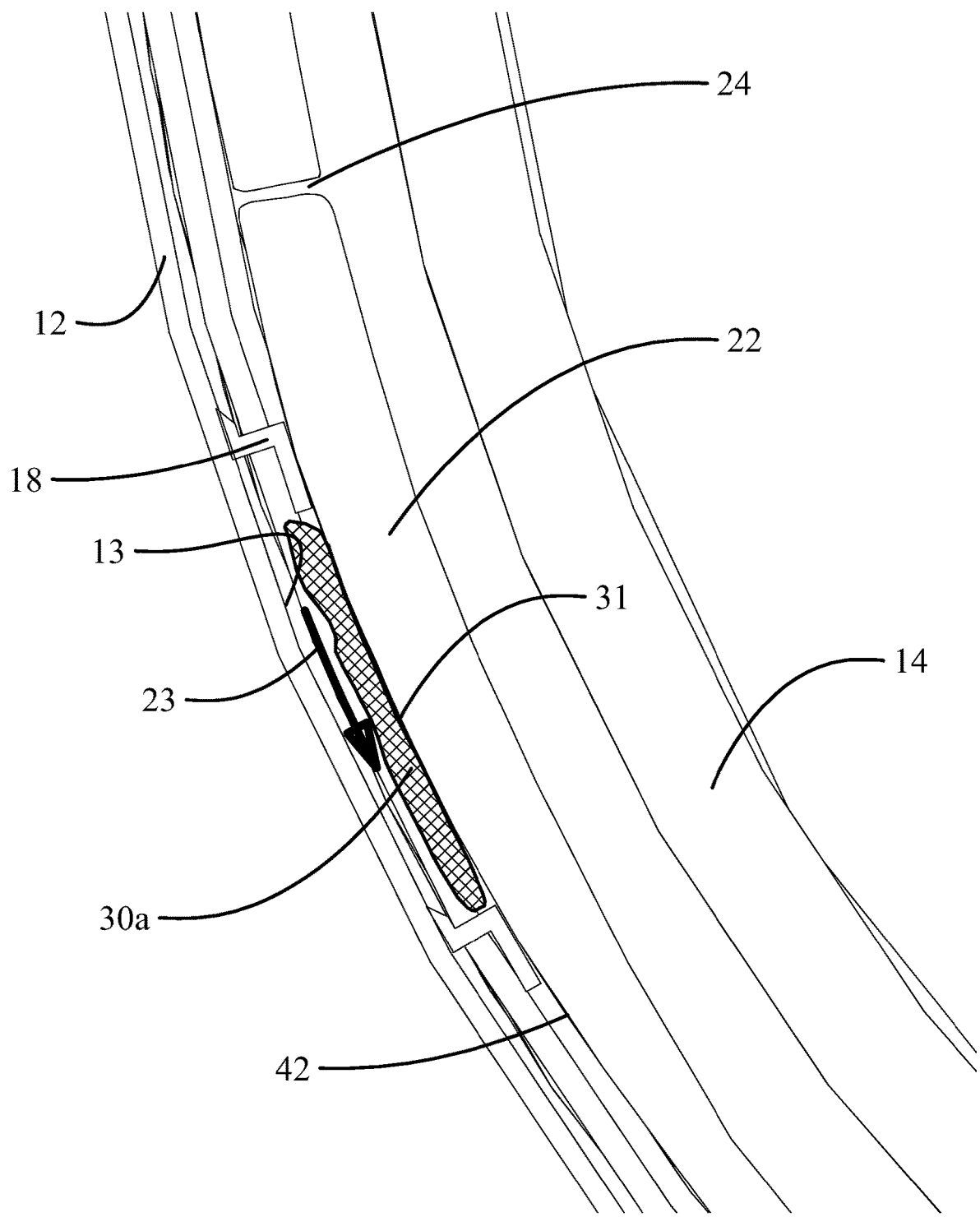
FIG. 3 is a detailed view of bubble FIG. 3 in FIG. 2.

FIG. 3 shows an example installation of bladder 30a in a collapsed condition. The bladders 30a, 30b may be loosely filled with nitrogen or other dry gas at nominally sea level atmospheric pressure and sealed. When the aircraft 8 is on the ground in service, the bladders 30a, 30b will be in the collapsed condition. As seen in FIG. 3, the bladder 30a may be attached to the insulation blanket 22. An attachment system 31, such as an adhesive or hook and loop fasteners, are employed in exemplary embodiments for attachment.

Figure 4:
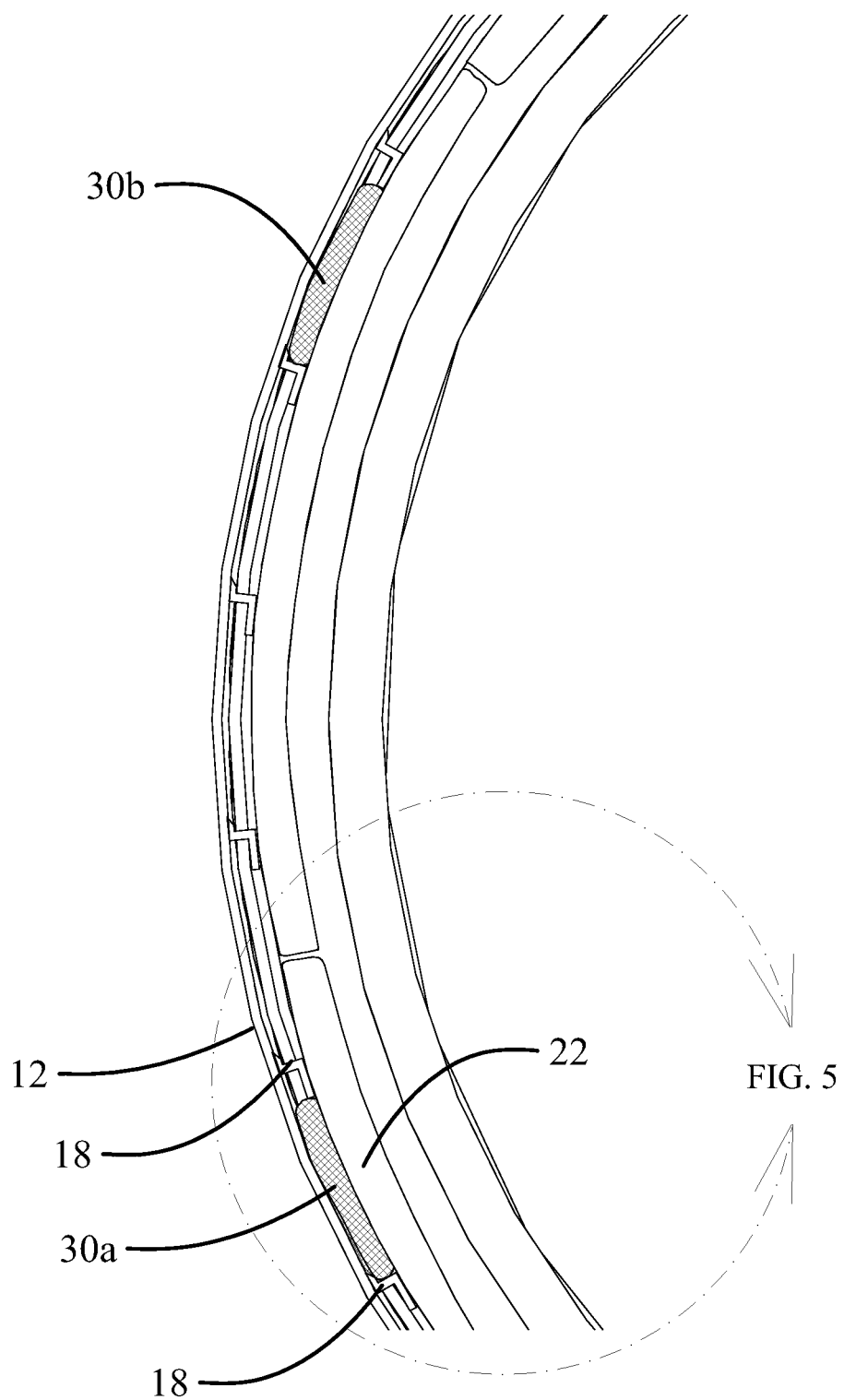
FIG. 4 is a partial end section view of the fuselage structure showing the expandable bladders in the expanded position between structural members.
Figure 5:
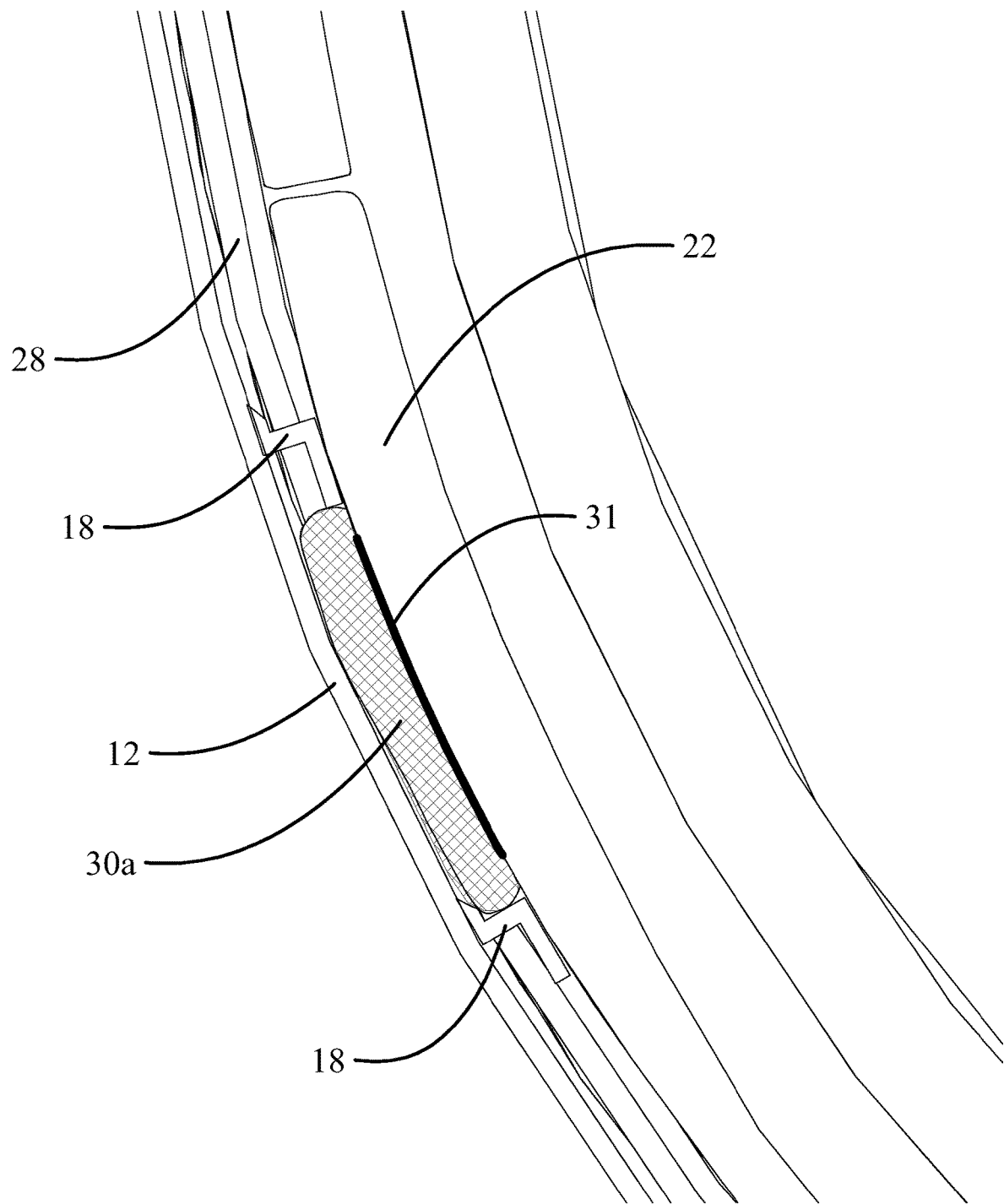
FIG. 5 is a detailed view of bubble FIG. 5 in FIG. 4.
Figure 6:
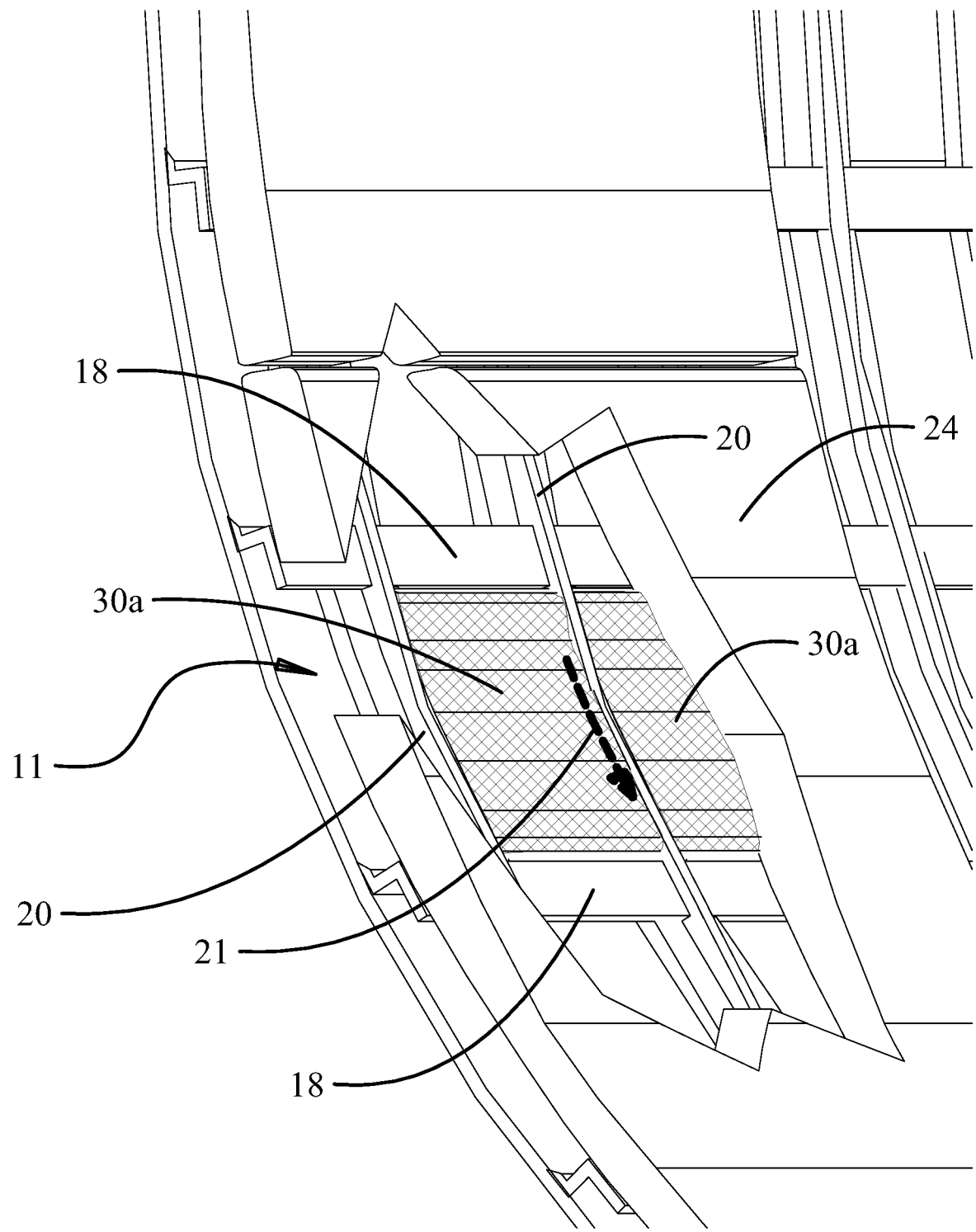
FIG. 6 is a partially sectioned view of the bladders as shown in FIG. 2.

As seen in FIGS. 4 and 5, when the aircraft 8 is flying at altitude where ambient air pressure is reduced, the sealed bladders 30a, 30b will expand due to the captured volume of gas, filling the stringer pocket 28 and providing substantially sealing contact against the adjacent stringers 18 and between the insulation blanket 22 and skin 12. As seen in FIG. 6 the bladders (bladder 30a as an example) may have a longitudinal width sized to extend between the frames 20 in the expanded condition.

Figure 7:
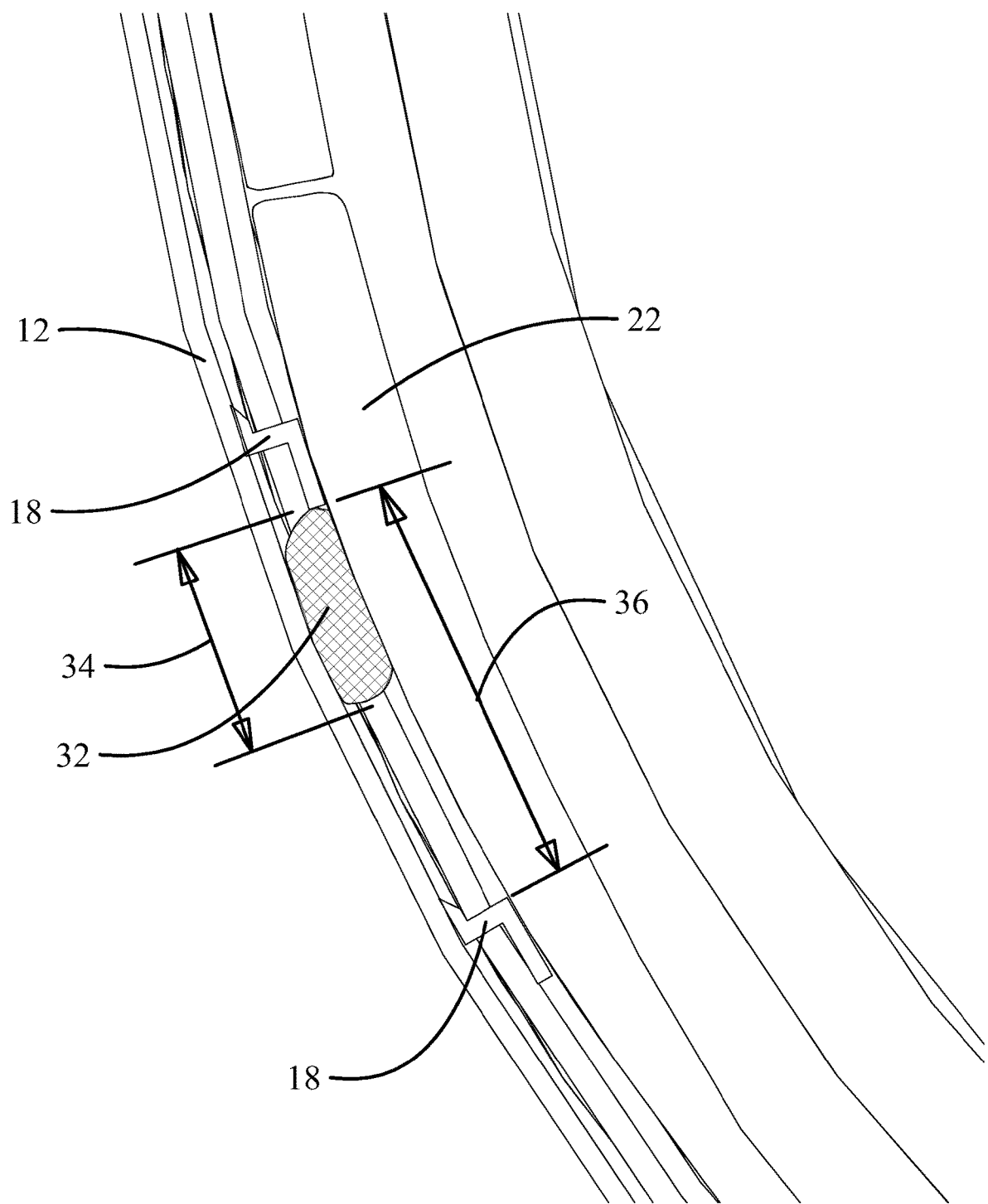
FIG. 7 is a detailed side section view of an expandable bladder having a reduced vertical profile.
Figure 8:
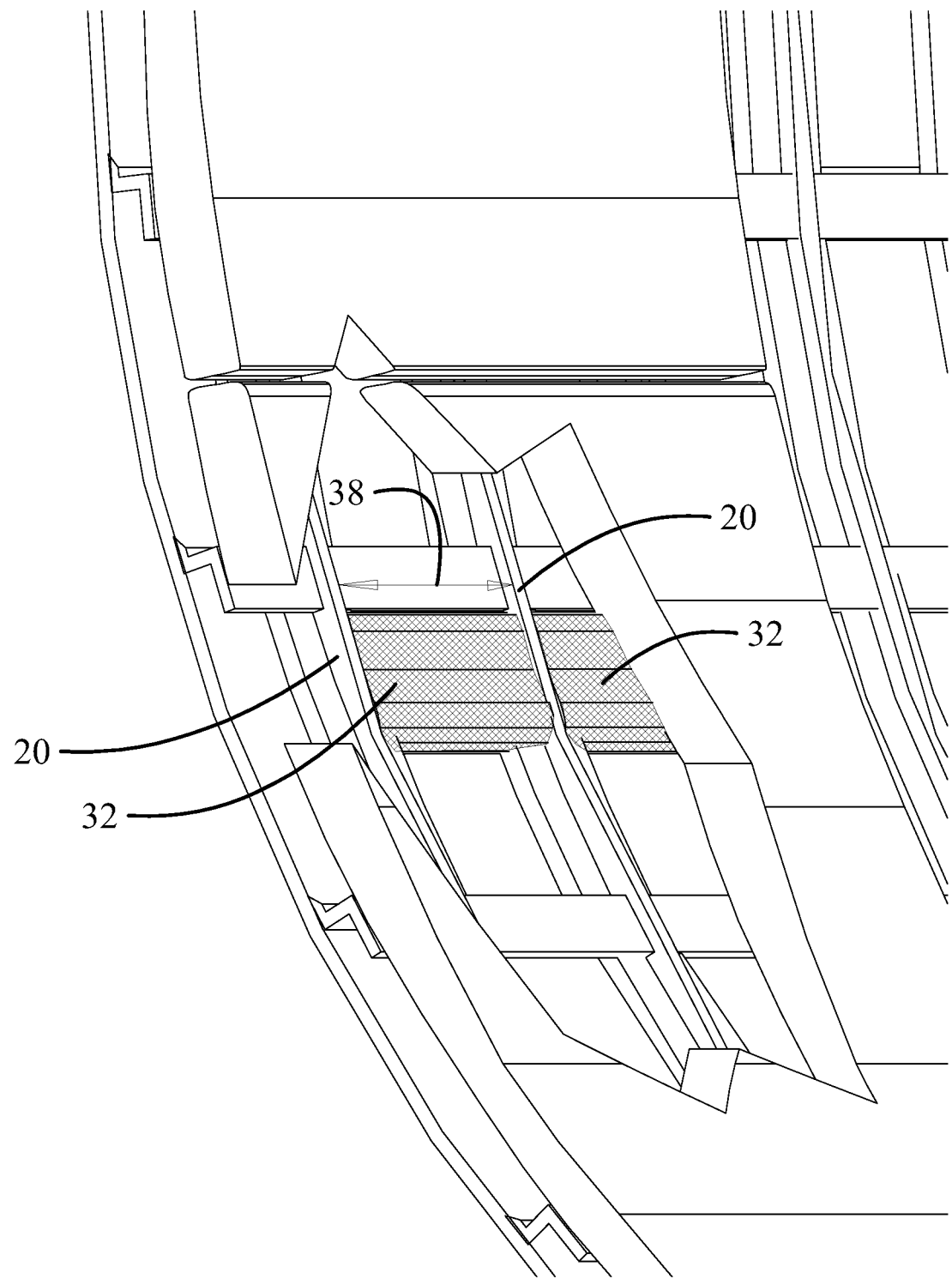
FIG. 8 is a partially sectioned view of the bladders as shown in FIG. 7.

One consideration in control of moist air migration is flow circumferentially about the fuselage. Consequently, placement of a plurality of bladders 30a, 30b between adjacent frames 20 extending longitudinally along the fuselage 10 near or between gaps 24 defined between the insulation blankets 22 will typically be desirable. Multiple rows of bladders, 30 such as lower row bladders 30a and upper row bladders 30b, are desirable to prevent either ascending or descending flow at multiple circumferential locations in the stringer pockets 28. Smaller bladders 32, in alternative embodiments as seen in FIGS. 7 and 8, may have a reduced height 34 and not expand to fill the entire circumferential distance 36 between stringers 18. However, the longitudinal length 38 of the bladder 32 in the expanded condition will be sufficient to extend between the frames 20 (as seen in FIG. 8) for substantially sealing contact with adjacent frames 20 thereby preventing circumferential flow of air between the frames 20. Other than the size, the bladders 32 are substantially similar to the bladders 30 and the description of the bladders 30 applies to the bladders 32.

Figure 9:
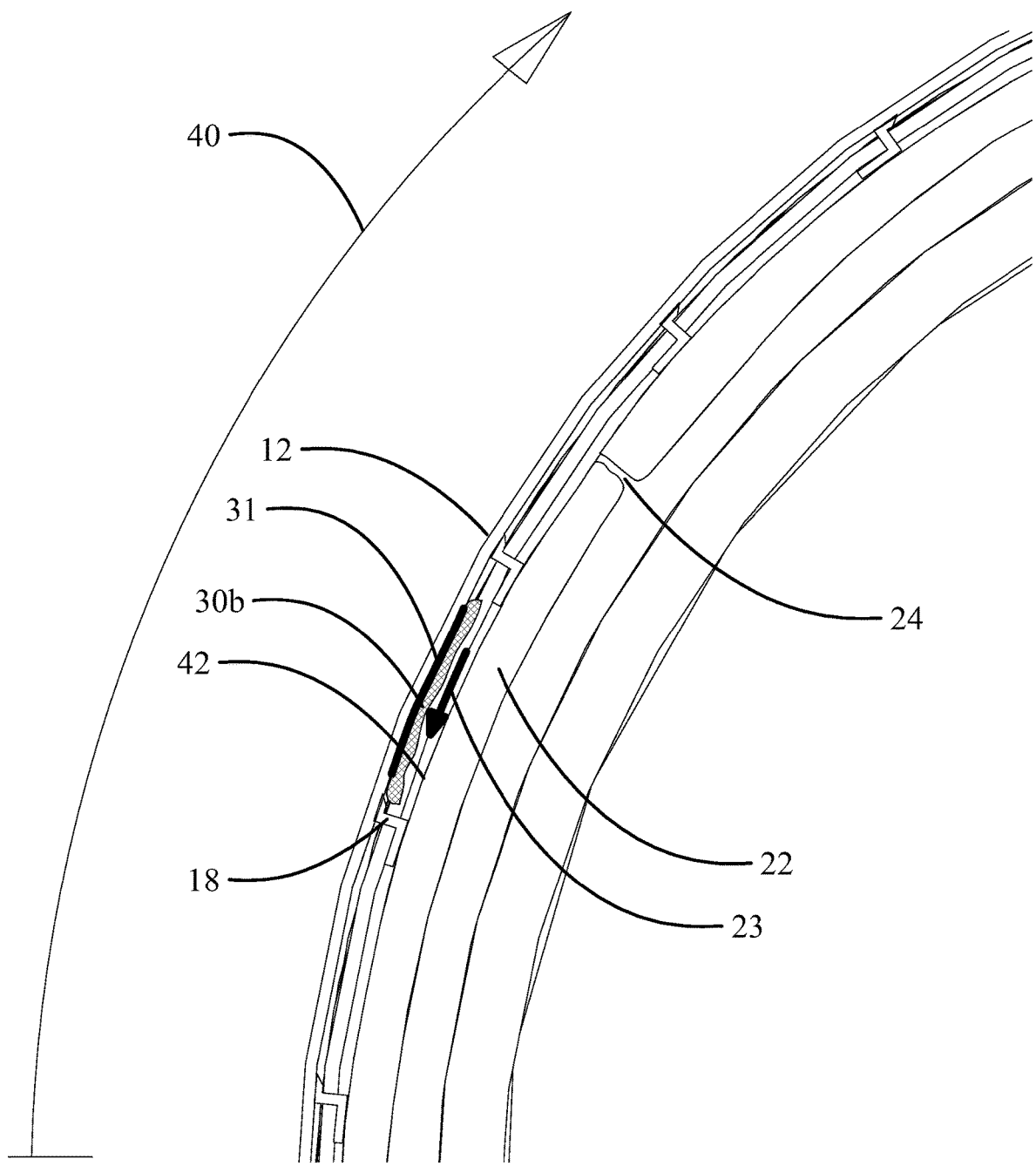
FIG. 9 is a detailed view of section of bubble FIG. 9 in FIG. 2.

In various embodiments, for bladders 30b located in an upper quadrant 40 of the fuselage 10, it may be desirable to have the bladder 30b attached using attachment system 31 to the interior 13 of the skin 12 or held within the stringers 18 against the skin 12, as seen in FIG. 9, to allow any condensate to have an alternative flow path 23 down the external surface 42 of the insulation blankets 22. Bladders 30a located in a lower quadrant 44, attached to the insulation blanket(s) 22 as described with respect to FIGS. 2 and 3, allow condensate to have the alternative flow path 23 down an interior surface 13 of the skin 12 when the aircraft 8 is not in service to avoid moisture buildup. In both configurations, longitudinal collapse allows a flow path 21 to form along the frames 20 (represented in FIG. 6).

Figure 10:
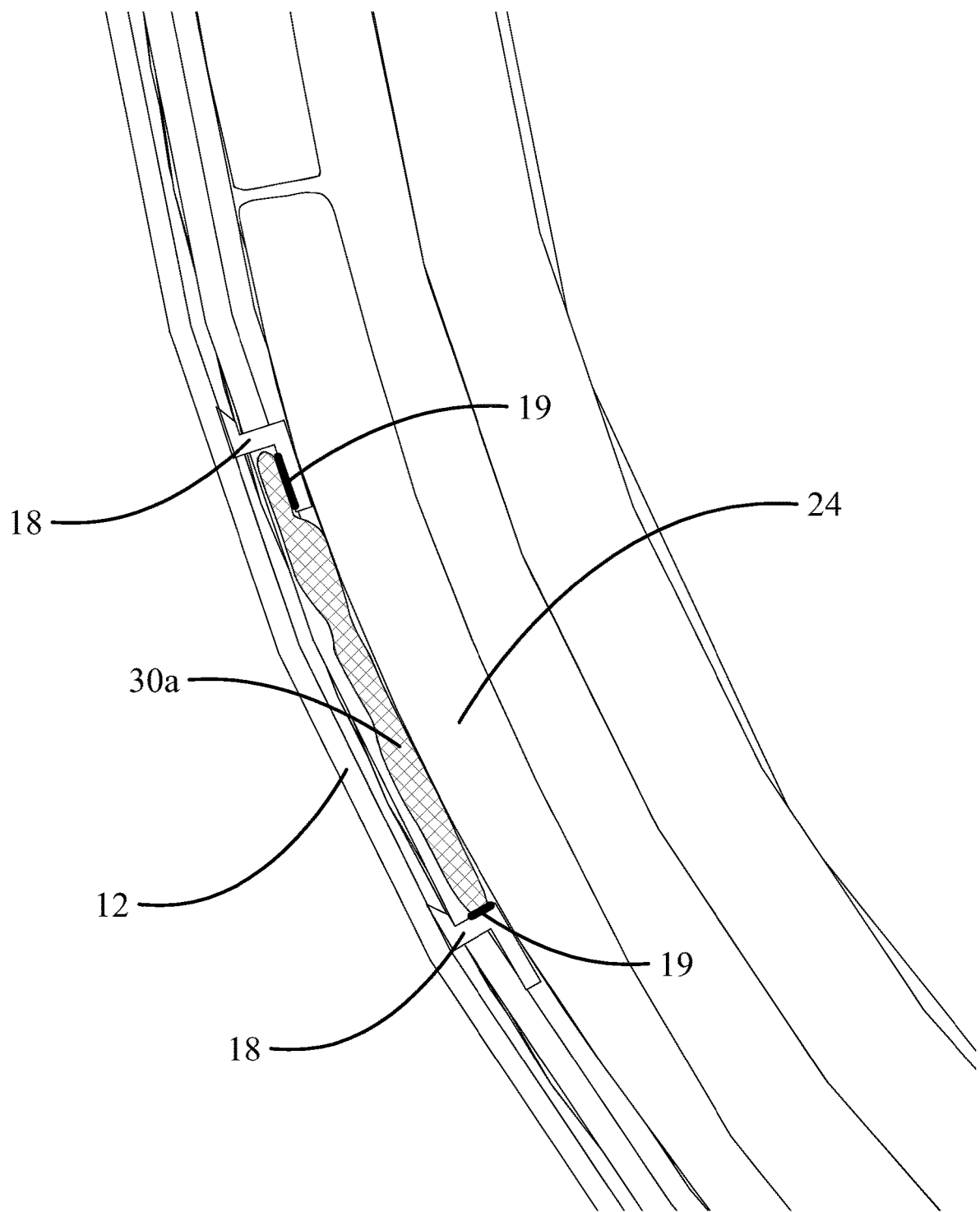
FIG. 10 is a detailed view of alternative attachment of the bladder to the structural member; and, FIG. 11 is a flow chart depicting a method for use of moisture wicking heat shrinkable tubing for moisture control in an aircraft.

As seen in FIG. 10, as an alternative to attachment to the insulation blanket 22 or skin 12, the bladders (bladder 30a as an example) may be supported by attachment to the stringers 18. As for attachment to the insulation blanket 22 or the skin 12, attachment to the stringers 18 is accomplished using an attachment system 19, such as an adhesive or hook and loop fasteners.

The bladders 30, 32 are formed to expand under a pressure differential of about 3 to 4 pounds per square inch (psi) (probably closer to 3 psi (400 N/m)) such that the bladder 30, 32 is fully expanded when the aircraft 8 is cruising at 30,000 feet (ft) (9144 meters (m)). The bladder 30, 32 should also collapse as the aircraft 8 descends to form flow paths as the ice melts, as previously discussed. The bladder material is also durable enough to survive many flight cycles (e.g., to survive at least the number of flight cycles between aircraft overhauls). Other considerations for the material of bladder 30, 32 include ozone exposure, temperature range, and flammability.

In exemplary embodiments, the bladder 30, 32 may be resiliently expandable and formed from material such as a natural or synthetic rubber as used in high-pressure valve diaphragms or high-pressure valves. Alternatively, the bladder 30, 32 may be collapsible and a polyester film (such as Mylar®) or similar material may be employed in forming the bladder 30, 32. When the bladder 30, 32 is collapsible (as with polyester film) it is sized to expand to the desired longitudinal width and circumferential height to contact the adjacent structural members, interior surface 13 of the skin 12 and/or exterior surface 42 of the insulation blanket 22 when inflated. When formed from resilient or elastic material (as with rubber) the bladder 30, 32 elastically expands in both circumferential height and/or longitudinal width to contact the adjacent structural members, interior surface 13 of the skin 12 and/or exterior surface 42 of the insulation blanket 22. In an exemplary aircraft structure, the initial unexpanded (collapsed) condition of the bladder 30,32 may have an internal gas filled volume of 122.5 cubic inches (in$^3$) (2007.4 cubic centimeters (cc)) while the expanded condition at altitude may result in the gas expanding the bladder 30 to a volume of 245 in$^3$ (4014.8 cc). With appropriate material selection, the bladders 30, 32 located in the lower quadrants 44 may operate as fire nub (or supplement existing fire nubs) when in the expanded condition at altitude.

Figure 11:
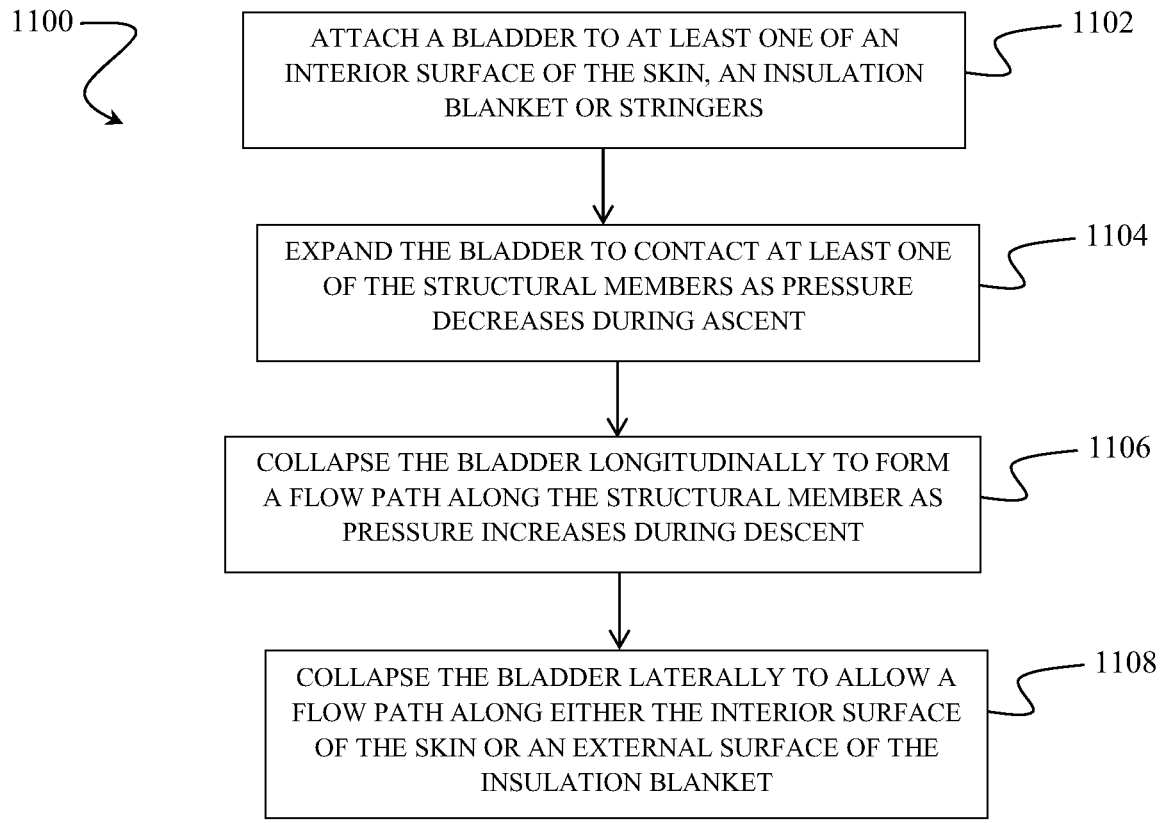

The embodiments disclosed provide a method 1100 for operating a moisture management system 11 in an aircraft 8 by including a bladder 30, 32 coupled between adjacent structural members 18, 20 between a skin 14 and an interior wall 14. As shown in FIG. 11, the bladder 30, 32 is attached to one of an interior surface 13 of the skin 12, an insulation blanket 22, or stringers 18, step 1102. The bladder 30 is expanded to contact at least one of the structural members 18, 20 as a pressure decreases during an ascent of the aircraft 11 step 1104. The bladder 30 collapses longitudinally to form a flow path 21 along the at least one structural member 18, 20 as the pressure increases during a descent of the aircraft 8, step 1106. The bladder 30 may also collapse laterally to allow a flow path 23 along either the interior surface 13 of the skin 12 or an external surface 42 of the insulation blanket 22, step 1108.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A moisture management system for use in an aircraft, the system comprising:
at least one bladder supported between adjacent structural members between a skin and an interior wall, the at least one bladder sealed with a gas contained therein, the at least one bladder having an unexpanded condition and an expanded condition, the bladder in the unexpanded condition sized to allow air flow between the at least one bladder and at least one structural member of the adjacent structural members and the bladder in the expanded condition sized to seal the bladder against the at least one structural member preventing air flow between the at least one bladder and the at least one structural member, the unexpanded condition induced with the aircraft situated on the ground and, the expanded condition induced passively as a pressure decreases during an ascent of the aircraft and said unexpanded condition induced during a descent of the aircraft.

2. The moisture management system as defined in claim 1 wherein the at least one bladder is polyester film.

3. A moisture management system for use in an aircraft, the system comprising:
structural members comprising frames and stringers between a skin and an interior wall of a fuselage, and a plurality of bladders mounted in multiple rows extending longitudinally between adjacent frames in the fuselage, each of the plurality of bladders sealed with a gas contained therein, each of the plurality of bladders having an unexpanded condition and an expanded condition, each of the plurality of bladders in the unexpanded condition sized to allow air flow between the bladder and at least an associated one of the structural members and each of the plurality of bladders in the expanded condition sized to seal the bladder against the associated one of the structural members preventing air flow between the bladder and the associated one of the structural members, the unexpanded condition induced with the aircraft situated on the ground and, and the expanded condition induced passively as a pressure decreases during an ascent of the aircraft, said unexpanded condition induced as the pressure increases during a descent of the aircraft.

4. The moisture management system as defined in claim 3 wherein each of the plurality of bladders is attached to at least one of the stringers using adhesive or hook and loop fasteners.

5. The moisture management system as defined in claim 3 further comprising a plurality of insulation blankets mounted between the skin and the interior wall.

6. The moisture management system as defined in claim 5 wherein each of the plurality of bladders is attached to one of said plurality of insulation blankets using adhesive or hook and loop fasteners.

7. The moisture management system as defined in claim 5 wherein each of the plurality of bladders is attached to the skin using adhesive or hook and loop fasteners.

8. The moisture management system as defined in claim 3 wherein each of the plurality of bladders is resiliently expandable.

9. The moisture management system as defined in claim 8 wherein each of the plurality of bladders is rubber.

10. The moisture management system as defined in claim 3 wherein each of the plurality of bladders is sized to accommodate an expanded gas volume in an expanded condition during ascent and collapses to an unexpanded condition during descent.

11. An aircraft fuselage structure comprising:
a sealed bladder positioned between adjacent structural members in a fuselage, said bladder having an unexpanded condition and an expanded condition, said bladder contacting a skin and an insulation blanket and sized such that the expanded condition prevents either ascending or descending flow between the adjacent structural members, and said bladder sized such that the unexpanded condition allows either ascending or descending flow between the adjacent structural members, the bladder passively expanding to the expanded condition when a pressure in the fuselage reduces and collapsing to the unexpanded condition when pressure in the fuselage increases.

12. The aircraft fuselage structure as defined in claim 11 wherein the bladder is collapsible or resilient.

13. The aircraft fuselage structure as defined in claim 11 wherein the structural members comprise stringers and frames, wherein the bladder is mounted between stringers.

14. The aircraft fuselage structure as defined in claim 11 wherein the bladder is attached to the insulation blanket using adhesive or hook and loop fasteners.

15. The aircraft fuselage structure as defined in claim 11 wherein the bladder is attached to the skin using adhesive or hook and loop fasteners.

16. The aircraft fuselage structure as defined in claim 13 wherein the bladder is attached to at least one of the stringers using adhesive or hook and loop fasteners.

17. A method for operating a moisture management system in an aircraft, the moisture management system including a plurality of sealed bladders coupled between structural members comprising frames and stringers between a skin and an interior wall of a fuselage, and said plurality of sealed bladders mounted in multiple rows extending longitudinally between adjacent frames, each of the plurality of sealed bladders having an unexpanded condition and an expanded condition, and each of the plurality of sealed bladders sized to contact and seal against at least an associated one of the structural members in the expanded condition and to allow airflow past the associated one of the structural members in the unexpanded condition, the method comprising:

passively expanding each of the plurality of sealed bladders to the expanded condition to contact at least an associated one of the structural members as a pressure decreases during an ascent of the aircraft; and collapsing the sealed bladder to the unexpanded condition to form a flow path along the associated one structural member as the pressure increases during a descent of the aircraft.

18. The method as defined in claim 17 wherein expanding the bladder comprises resiliently expanding each of the plurality of bladders.

19. The method as defined in claim 17 further comprising:

expanding each of the plurality of bladders to contact the skin as the pressure decreases; and collapsing each of the plurality of bladders to form an alternative flow path along the skin as the pressure increases.

20. The method as defined in claim 17 further comprising:

expanding each of the plurality of bladders to contact an associated insulation blanket as the pressure decreases; and collapsing each of the plurality of bladders to form an alternative flow path along the associated insulation blanket as the pressure increases.

* * * * *